United States Patent [19]
Hoffman

[11] 4,451,811
[45] May 29, 1984

[54] MAGNET STRUCTURE

[75] Inventor: George J. Hoffman, Malibu, Calif.

[73] Assignee: Litton Systems, Inc., Beverly Hills, Calif.

[21] Appl. No.: 424,570

[22] Filed: Sep. 27, 1982

Related U.S. Application Data

[62] Division of Ser. No. 62,197, Jul. 30, 1979, abandoned, and Ser. No. 209,628, Nov. 24, 1980.

[51] Int. Cl.³ .............................................. H01F 7/02
[52] U.S. Cl. .................................. 335/302; 335/306; 308/10
[58] Field of Search ............... 335/302, 303, 306, 305; 308/10

[56] References Cited

U.S. PATENT DOCUMENTS

| 3,250,831 | 5/1966 | Hooper | 264/24 |
| 3,349,354 | 10/1967 | Miyata | 335/306 X |
| 3,710,291 | 1/1973 | Nicoud | 335/306 |

FOREIGN PATENT DOCUMENTS

| 842531 | 12/1958 | United Kingdom | 335/306 |
| 1409789 | 10/1975 | United Kingdom | 335/231 |

Primary Examiner—George Harris
Attorney, Agent, or Firm—Roy L. Brown

[57] ABSTRACT

A magnet for use in a bearing, such magnet preferably having a cylindrical bore to receive a shaft and ferrofluid between the shaft and the bore walls. The magnet is magnetized with its internal magnetization radially directed relative to the axis of the bore.

4 Claims, 4 Drawing Figures

MAGNET STRUCTURE

This is a division of application Ser. No. 62,197, filed July 30, 1979, now abandoned and of application Ser. No. 209,628, filed Nov. 24, 1980.

BACKGROUND OF THE INVENTION

In recent years, bearing assemblies such as those disclosed in U.S. Pat. Nos. 3,726,574; 3,746,407; 3,891,282 and 3,918,773 have self-contained fluid pools. Those patents are assigned to the same assignee as the present invention. Such fluidic, low friction self-contained bearings are made possible by the development of magnetically responsive magnetizable fluid given the name ferrofluid by its developer, Dr. Ronald E. Rosensweig. Ferrofluid is described in Rosensweig's "Progress in Ferrohydrodynamics," *Industrial Research,* October, 1970, Vol. 12, No. 10, 36–40. Ferrofluid as defined therein is a dispersion of colloidal magnetic particles in a liquid carrier. These particles tend to align themselves with applied magnetic fields. It should be noted from the description of ferrofluid that ferrofluid need not necessarily contain iron or ferrous-type metal. It is only necessary, for a fluid to be so-called, that the fluid be magnetizable or capable of being influenced by magnetic fields. The term "magnetic fluid" is used interchangeably herein with the term "ferrofluid".

The bearings described in the above-identified letters patent each concentrate the magnetic field at particular axial positions along the shaft to produce a seal for the ferrofluid. Typically vanes, or the like, are used to distribute ferrofluid on the bearing surface to maintain a sufficient fluid thickness to support or lubricate the bearing.

More recently the assignee has filed U.S. patent application Ser. No. 34,549 on Apr. 30, 1979, now U.S. Pat. No. 4,254,961 which issued Mar. 10, 1981 for a "Seal for a Fluid Bearing", by Rena Fersht, et al. The bearing shown and described in that patent application also concentrates the magnetic field at the seal points, but the structure may be modified according to this invention.

The above-mentioned fluid bearings use magnet structures of various configurations which are different than the magnet structures used in this invention.

BRIEF DESCRIPTION OF THE INVENTION

The ferrofluid bearing of this invention uses a magnetic sleeve as a bearing for a shaft. The magnetic sleeve is a permanent magnet which produces a magnetic field, having both radial and axial components, between the bearing and the shaft. The axial components are directed inwardly toward the center of the bearing, and the ferrofluid is held within the bearing. The opposing surfaces of the shaft and bearing may be contoured or smooth at the option of the designer.

To produce the desired magnetic field configuration, the bearing sleeve is magnetized with the pole faces on the outer and inner surfaces of the sleeve instead of the usual practice of placing the poles on the ends of the cylinder. The internal magnetization of the sleeve is radially directed.

To produce a cylindrical sleeve having a high intensity magnetic field in a small volume and having the pole faces on the outer and inner surfaces, the sleeve may be made of platinum cobalt alloy or rare earth cobalt alloys such as samarium cobalt alloys. Other permanent magnet materials may be used, however, at considerably lower flux fields.

The sleeve is either fabricated in axial slices or is cut into axial slices. The slices are each magnetized by placing them into an electromagnetic field which is poled to induce permanent magnet pole positions on the outer and inner surface of the slices. The slices are then assembled or reassembled into a cylindrical sleeve.

The shaft may be either ferromagnetic or nonferromagnetic. In a typical embodiment the shaft may have a thin layer of ferromagnetic material on its outer surface. If the shaft has ferromagnetic material, the operation is enhanced by the increase in magnetic field intensity within the region between the shaft and bearing.

It is a primary object of this invention to provide a hollow cylindrical magnet with its pole faces on the inner and outer surfaces thereof.

It is an object of this invention to provide a permanent magnet which is useful in the bearing described herein.

BRIEF DESCRIPTION OF THE DRAWINGS

Other objects will become apparent from the following description, taken in connection with the accompanying drawings, in which.

DETAILED DESCRIPTION OF THE INVENTION

Figure 1:
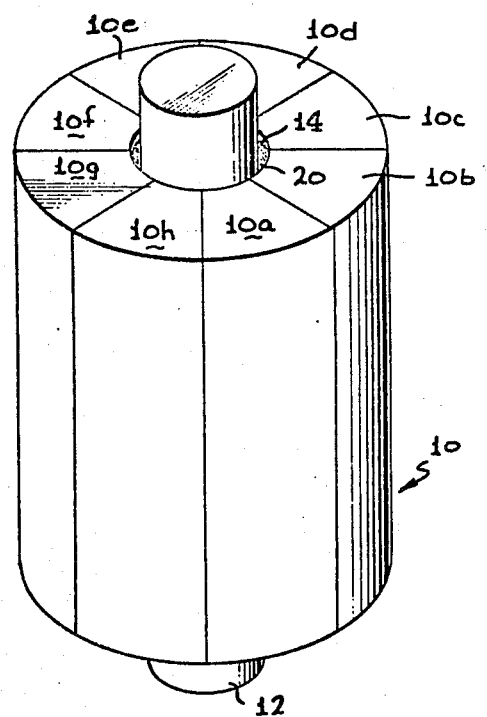
FIG. 1 is a profile view of a bearing and shaft according to this invention.

The ferrofluid bearing of this invention uses a permanent magnet bearing structure 10 which preferably has a generally circularly cylindrical shape. The apparatus is not limited, however, to a circular shape. The structure 10 is shown as a right circular cylinder having a coaxial right circular cylindrical bore therein for receiving a shaft 12 and a space containing ferrofluid 14 therebetween. The ferrofluid 14 serves as a lubricant between the shaft 12 and the surface 18 of the bore 20.

The bearing 10 and shaft 12 may rotate relative to each other, but it is not important which rotates. Both may rotate if desired.

Figure 3:
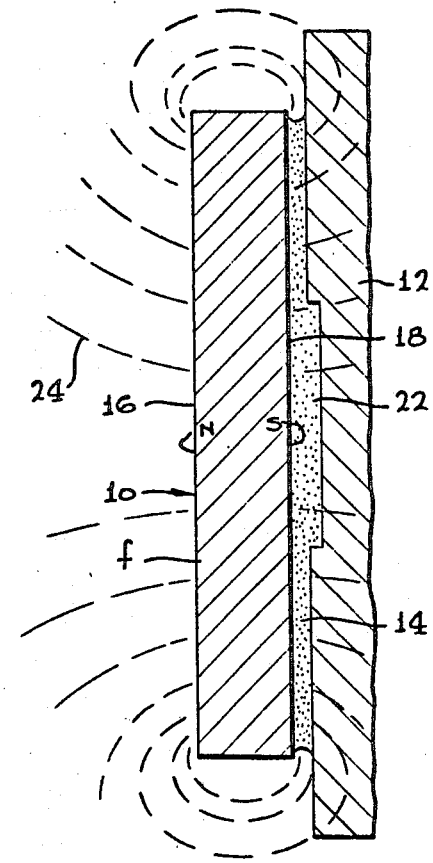
FIG. 3 is a sectional view taken at 3—3 in FIG. 2 and diagramming the magnetic field of the cylindrical magnet.

The bearing 10 is magnetized with a polarity configuration wherein the pole faces are on the outer surface 16 and the inner surface 18 thereof. Such polarity configuration produces a magnetic field having both radial and axial components within the ferrofluid 14, and the axial components are directed toward the center of the bearing bore 20. The magnetic field is indicated at 24 in FIG. 3. The magnetic field holds the ferrofluid 14 within the bore 20.

The shaft 12 may be of ferromagnetic material which enhances the magnetic field intensity in the ferrofluid 14. It need not, however, be of such ferromagnetic material. In one preferred embodiment, only the surface of the shaft is covered with ferromagnetic material.

Most of the bearing support occurs near the ends of the bore 20. To reduce power loss due to viscous damping, the diameter of the shaft 12 optionally may be reduced near the center of the bore 20 in the region 22.

Figure 2:
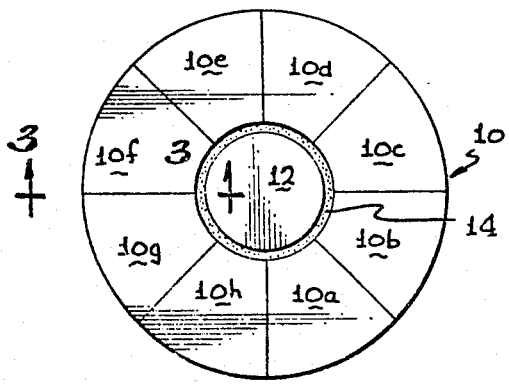
FIG. 2 is an end view of the apparatus of FIG. 1.
Figure 4:
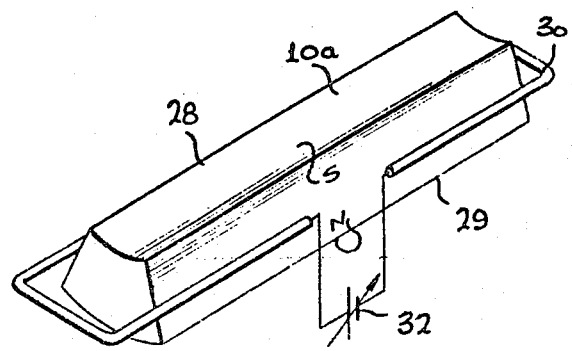
FIG. 4 is a profile view of a typical electromagnet magnetizing an axial slice of a cylindrical sleeve to produce pole faces on the inner and outer surface of an assembled cylinder.

To magnetize cylindrical member 10, the member 10 is axially sliced into slices 10a, 10b, 10c, 10d, 10e, 10f, 10g, 10h, and disassembled for magnetizing. Alternatively, the slices 10a, 10b, 10c, 10d, 10e, 10f, 10g, and 10h, may be fabricated into the shape shown in FIG. 4. For example, the slices may be cast or forged, or they may be made by powder metallurgy techniques. After the slices 10a, 10b, 10c, 10d, 10e, 10f, 10g, 10h, have been magnetized, they are assembled or reassembled into the cylinder shown in FIGS. 1 and 2.

To magnetize the slices they are placed in the field of an electromagnet which induces a permanent magnetism into the slice 10a with the pole faces on the inner and outer surfaces 28, 29. The electromagnet 30 is shown with one coil turn, but obviously it may include many more turns to produce the required field intensity. The electromagnet 30 is energized, for example, from a DC energy source 32.

The bearing of this invention, because of a radially directed internal magnetization, is a simplified bearing which adequately confines the ferrofluid without leaking.

Although a description of a typical apparatus and method of this invention is shown in the Figures and described above, it is not intended that the invention shall be limited by that description alone, but only together with the accompanying claims.

What is claimed is:

1. A permanent magnet comprising:
    a two-poled permanent magnet structure having a circularly cylindrical bore therethrough, the interior of said bore forming one of said poles, said bore having an axis of symmetry;
    said structure being divided circumferentially of said bore into a plurality of substantially contacting circumferential segments each having an inner surface which is a circumferential segment of the cylindrical surface of said bore;
    all of said segments being magnetized along their entire length and about the entire portions of said circumference with their internal magnetizations identically poled in a radical direction relative to said axis and their pole strengths to be substantially equal, to cause substantially the entire surface of said circumferential segments of said bore to become identically and substantially uniformly poled magnetic pole faces of said segments.

2. A permanent magnet as recited in claim 1 wherein said structure is divided between said segments substantially by planes defined by radii from said axis and by said axis.

3. A permanent magnet as recited in claim 1 wherein the outer surface of said magnet structure is substantially circularly cylindrical.

4. A permanent magnet as recited in claim 3 wherein said outer and inner surfaces are substantially concentric about said axis, and the internal magnetizations of said segments are identically poled and radial of said axis to cause said entire inner cylindrical surface of said structure to be a different polarity magnetic pole piece of said magnet than the magnetic polarity of said outer cylindrical surface.

* * * * *